US009824097B2

United States Patent
Gaucher et al.

(10) Patent No.: US 9,824,097 B2
(45) Date of Patent: *Nov. 21, 2017

(54) ACCESS AND PRESENTATION OF FILES BASED ON SEMANTIC PROXIMITY TO CURRENT INTERESTS

(71) Applicant: International Business Machines Corporation, Armonk, NY (US)

(72) Inventors: Brian P. Gaucher, Brookfield, CT (US); Jeffrey O. Kephart, Cortlandt Manor, NY (US); Jonathan Lenchner, North Salem, NY (US); David O. S. Melville, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,058

(22) Filed: Dec. 5, 2016

(65) Prior Publication Data

US 2017/0075925 A1    Mar. 16, 2017

Related U.S. Application Data

(63) Continuation of application No. 15/254,254, filed on Sep. 1, 2016, now Pat. No. 9,576,043, which is a
(Continued)

(51) Int. Cl.
*G06F 17/30* (2006.01)
*H04L 12/58* (2006.01)
*H04L 29/08* (2006.01)

(52) U.S. Cl.
CPC .. *G06F 17/30241* (2013.01); *G06F 17/30112* (2013.01); *G06F 17/30572* (2013.01);
(Continued)

(58) Field of Classification Search
CPC .......... G06F 17/3087; G06F 17/30241; G06F 17/30265; G06F 17/30864;
(Continued)

(56) References Cited

U.S. PATENT DOCUMENTS 6,356,864 B1    3/2002    Foltz et al.
6,549,897 B1    4/2003    Katariya et al.
(Continued)

FOREIGN PATENT DOCUMENTS

WO    2013138859 A1    9/2013

OTHER PUBLICATIONS

Cui et al., "TextFlow: Towards Better Understanding of Evolving Topics in Text"; IEEE TRANSACTIONS ON VISUALIZATION AND COMPUTER GRAPHICS, vol. 17, No. 12, Dec. 2011, pp. 2412-2421.
(Continued)

*Primary Examiner* — Cam-Y Truong
(74) *Attorney, Agent, or Firm* — Adolph C. Bohnstedt (57) ABSTRACT

A computer program product for managing and rendering one or more information nodes relative to a current focus. The computer program product receives one or more principal topics from an analysis of the information nodes. The computer program product determines a topic vector from a similarity of a first information node to each of the principal topics and a map from the topic vector to a storage location of the first information node. The computer program product determines one or more current topics from a second information node that has been recently accessed by a user and a current focus vector from a similarity of the one or more current topics to the one or more principal topics. The computer program product renders the current focus vector
(Continued)

and the first information node according to a rendering algorithm that is applied to the current focus vector and the first information node.

1 Claim, 5 Drawing Sheets

Related U.S. Application Data continuation of application No. 15/098,485, filed on Apr. 14, 2016, now Pat. No. 9,460,191, which is a continuation of application No. 14/805,737, filed on Jul. 22, 2015.

(52) U.S. Cl.
CPC .. *G06F 17/30601* (2013.01); *G06F 17/30675* (2013.01); *G06F 17/30696* (2013.01); *G06F 17/30867* (2013.01); *G06F 17/30994* (2013.01); *H04L 51/04* (2013.01); *H04L 67/22* (2013.01); *H04L 67/327* (2013.01)

(58) Field of Classification Search
CPC ......... G06F 17/30011; G06F 17/30067; G06F 17/30244; G06F 17/30286; G06F 17/3061
See application file for complete search history.

(56) References Cited

U.S. PATENT DOCUMENTS

| | | |
|---|---|---|
| 8,228,821 B2 | 7/2012 | Robinson et al. |
| 8,515,959 B2 | 8/2013 | Cofino et al. |
| 8,645,298 B2 | 2/2014 | Hennig et al. |
| 8,676,815 B2 | 3/2014 | Deng et al. |
| 9,460,191 B1 | 10/2016 | Gaucher et al. |
| 2011/0213655 A1 | 9/2011 | Henkin et al. |
| 2012/0095952 A1 | 4/2012 | Archambeau et al. |
| 2013/0212110 A1 | 8/2013 | Stankiewicz et al. |
| 2014/0324864 A1 | 10/2014 | Choe et al. |
| 2015/0046151 A1* | 2/2015 | Lane ................... G06F 17/2785 704/9 |
| 2015/0220530 A1* | 8/2015 | Banadaki .......... G06F 17/30943 707/723 |
| 2016/0110428 A1* | 4/2016 | Vasenkov ......... G06F 17/30734 707/776 |

OTHER PUBLICATIONS

IBM Appendix P, "List of IBM Patents or Patent Applications Treated as Related", Dated Apr. 27, 2017, 2 pages.

Appendix P, List of IBM Patents or Patent Applications Treated as Related, Dec. 6, 2016, 2 pages.

Bloehdorn et al., "TagFS—Tag Semantics for Hierarchical File Systems", Copyright is held by the author/owner(s), WWW2006, May 22-26, 2006, Edinburgh, UK, 6 pages.

Gaucher et al., "Access and Presentation of Files Based on Semantic Proximity to Current Interests", U.S. Appl. No. 14/805,737, filed Jul. 22, 2015.

Gaucher et al., "Access and Presentation of Files Based on Semantic Proximity to Current Interests", U.S. Appl. No. 15/098,485, filed Apr. 14, 2016.

Gaucher et al., "Access and Presentation of Files Based on Semantic Proximity to Current Interests", U.S. Appl. No. 15/254,254, filed Sep. 1, 2016.

Seltzer et al., "Hierarchical File Systems are Dead", pp. 1-5, provided in post disclosure on Sep. 4, 2014, <https://www.usenix.org/legacy/events/hotos09/tech/full_papers/seltzer/seltzer.pdf)>.

"Wordle" copyright 2013, provided in main idea on Jan. 10, 2015, 1 page, <http://www.wordle.net/>.

\* cited by examiner

ACCESS AND PRESENTATION OF FILES BASED ON SEMANTIC PROXIMITY TO CURRENT INTERESTS

BACKGROUND OF THE INVENTION

The present invention relates generally to the field of information organization, access, and presentation and more particularly to the management and presentation of information based on the relevance of its semantic content to a user's current interests.

The management and presentation of large amounts of information to a user in a manner that does not impose a high cognitive burden is a growing challenge as the amount of data that is available to be considered and analyzed steadily increases. Machines can help by performing a triage on available information, estimating what is relevant to a current focus and thereby decreasing the amount of information a user must consider. The amount of relevant information considered is one component of the burden, but equally significant is the form in which the information is presented. If information can be presented in a way that simply reflects relationships among the information considered and the strength of these relationships, then the cognitive burden imposed on the user can sometimes be decreased.

A force directed graph is a means for presenting information and the relationships between information. The idea of a force directed graph is to spatially represent a set of nodes, where a node is a data or information (e.g., text, a word, an email), such that nodes rendered in proximity to one another tend to be more intimately connected to one another along some dimension or set of dimensions (e.g., a topic discussed in the nodes if, say, the node represent text), and such that the attraction among like nodes and repulsion among non-like nodes obeys a force-distance relationship known from physics. Force-directed graph drawing algorithms are a class of algorithms for drawing graphs in an aesthetically pleasing manner.

SUMMARY

A computer program product for managing and rendering one or more information nodes relative to a current focus. The computer program product receives one or more principal topics from an analysis of a content of the one or more information nodes. The computer program product further determines a topic vector from a similarity of a content of a first information node in the one or more information nodes to each of the one or more principal topics. The computer program product further determines a map from the topic vector to a storage location of the first information node. The computer program product further determines one or more current topics from a content of a second information node that has been recently accessed by a user. The computer program product further determines a current focus vector from a similarity of the one or more current topics to each of the one or more principal topics. The computer program product further renders a representation of the current focus vector and a representation of the first information node according to a rendering algorithm that is applied to the current focus vector and the first information node, wherein a position and a size of the representation of the current focus vector and of the first information node is determined by the rendering algorithm.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In an embodiment of the present invention, the content of a file is compared to a set of principal topics when it is stored in the file system and that comparison is recorded in a file system index. The index is a data structure that maps a similarity of the file's content to each of the principal topics to the storage location of the file. The file is accessed by presenting the topics in the file's content to the index. In an embodiment, a user's recent accesses are monitored and their content is compared to the set of principal topics. The result of this comparison is used to create a current focus for the user. Representations of the current focus and some or all of the files in the file system are rendered visually in a way that expresses the semantic similarity between the content of the files and the current focus. For example, files with similar content are rendered closer to one another (with the distance depending on how similar their contents are) while files with dissimilar content are rendered farther apart. The user can access a file (e.g., one that is closely related to the user's current focus) by selecting its rendered representation. In an embodiment, a force directed graph is used to render the representations of the files and the current focus.

Embodiments of the present invention recognize that the cognitive burden of a user is sometimes decreased by presenting files and a user's current interests (a current focus) in a way that reflects the strength of their semantic similarity while providing a method for the user to access them, without the user having to access and navigate a traditional hierarchical file system.

Figure 1:
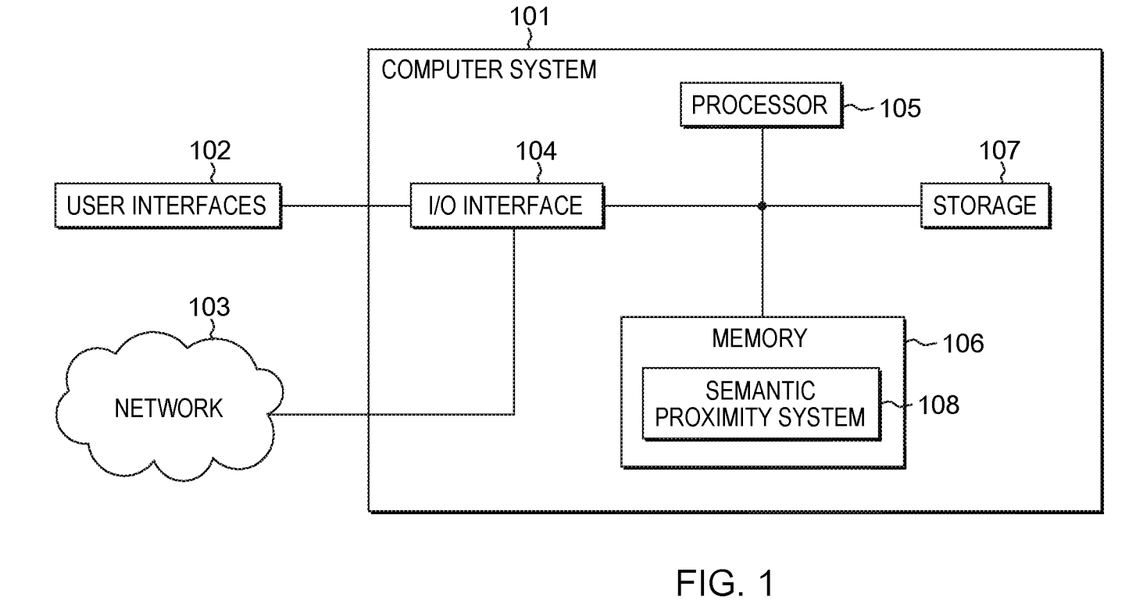
FIG. 1 depicts a block diagram of a computer system attached to a network and user interfaces in accordance with an embodiment of the present invention.

FIG. 1 depicts computer system 101 that, in some scenarios and embodiments, includes I/O interface 104, processor 105, storage 107, and memory 106. In an embodiment, semantic proximity system 108 resides in memory 106. User interfaces 102 and network 103 are connected to computer system 101. Semantic proximity system 108 generates a current interest file from recent user activity and presents representations of it and other files to reflect the similarity and/or dissimilarity of content among the files to the user. A file can be any file whose information content can be interpreted and given meaning. For example, a file may include, in whole or part, a document (e.g., text, source code), an email, audio, an image, a hologram, video, a core dump, or other interpretable information.

Figure 2:
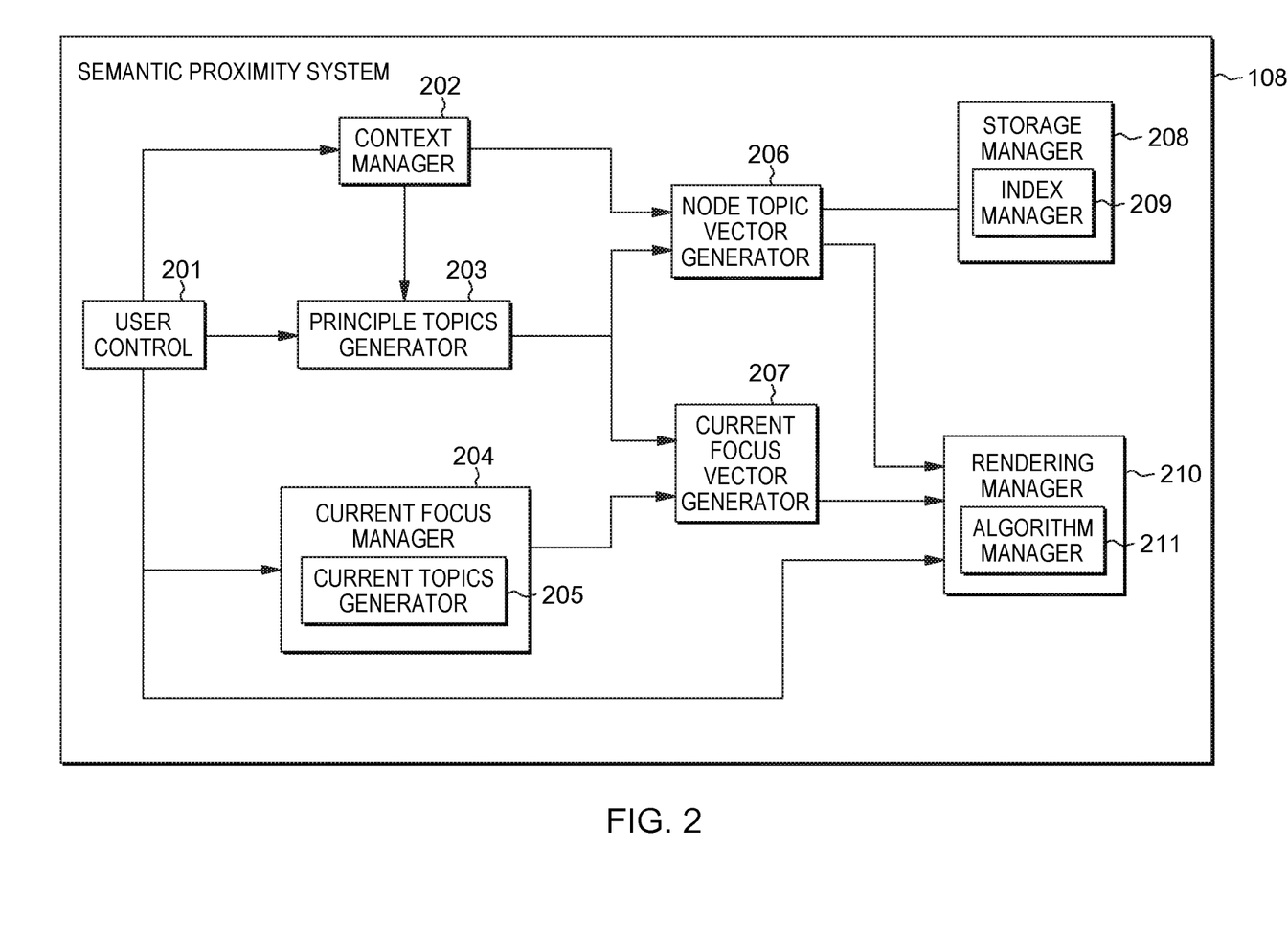
FIG. 2 depicts a block diagram of a semantic proximity system that is depicted in FIG. 1, in accordance with an embodiment of the present invention.

FIG. 2 depicts the functions in semantic proximity system 108 in more detail. In some scenarios and embodiments, semantic proximity system 108 includes user control 201, context manager 202, principal topics generator 203, current focus manager 204, node topic vector generator 206, current focus vector generator 207, storage manager 208, and rendering manager 210. In some scenarios and embodiments, current focus manager 204 includes current topics generator 205, storage manager 208 includes index manager 209, and rendering manager 210 includes algorithm manager 211.

In an embodiment, user control 201 is an interface for control input from a user that enables the user to modify a functionality and configuration of semantic proximity system 108. Context manager 202 manages a selection of information nodes (stored in storage 107) that are rendered (by rendering manager 210) together with a current focus of a user (generated by current focus manager 204).

In an embodiment, context manager 202 selects all or some of the files (also called information nodes) in storage 107 to be rendered with a current focus. In an embodiment, the selection of the information nodes is based on input from user control 201. In an embodiment, a user selects the information nodes to be rendered with a current focus. In an embodiment, a user guides a selection of information nodes by providing a characterization of the information nodes to be selected for rendering with a current focus to context manager 202 and the characterization is used by context manager 202 to select information nodes in storage 107 that meet the characterization. In an embodiment, the information nodes to be rendered are selected by an algorithm.

In an embodiment, principal topics generator 203 performs an analysis of the content of the information nodes in the selection of information nodes selected by context manager 202 and extracts one or more topics from each information node. It then generates a set of principal topics by selecting the most pervasive and representative topics from the topics that principal topics generator generated from each information node. An information node may include, in whole or part, a document (e.g., text, source code), an email, audio (e.g., speech), an image, a hologram, video, a core dump, or other interpretable information. The analysis identifies and generates a set of principal topics, i.e., the primary topics that are in the content of the information nodes in the selection of information nodes. In an embodiment, if the information nodes in the selection of information nodes contain text information, principal topics generator 203 uses a Latent Dirichlet Allocation (LDA) algorithm to perform the analysis. In another embodiment, if the information nodes in the selection of information nodes contain text information, principal topics manager 203 uses a probabilistic latent semantic indexing (pLSI) algorithm to perform the analysis. In other embodiments, principal topics generator 203 uses other algorithms to perform the analysis that are appropriate to the type of information contained in the information nodes in the selection of information nodes. For example, if an information node contains video, an algorithm that can analyze the video and characterize its content (e.g., a car chase, a wedding, or a rocket launch) is used by principal topics generator 203 to perform the analysis.

In an embodiment, node topic vector generator 206 receives the selection of information nodes from context manager 202 and the set of principal topics (that were generated from the content of the selection of information nodes) from principal topics generator 203. Node topic vector generator 206 generates a set of node topic vectors, one node topic vector for each information node in the selection of information nodes. In an embodiment, a node topic vector contains a list of values that reflect the affinity that the information node has for each principal topic. Values in a node topic vector are in one-to-one correspondence with the principal topics in the set of principal topics.

In an embodiment, current focus manager 204 monitors and records the information accessed during a user's recent information access activity. For example, current focus manager 204 monitors and records a user's access to web sites, files (including emails), and multimedia (e.g., images, audio, video, movies, and holograms) as well as the user's potential editing of the files and media.

In an embodiment, current topics generator 205 analyzes the information in the record of the user's recent information access activity and identifies a set of primary topics (i.e., prevalent topics). In an embodiment, current topics generator 205 generates an artificial document from set of current topics with a content that reflects the prevalence of each primary topic in the user's recent information access activity. In an embodiment, the artificial document represents the user's current focus.

In an embodiment, if the record includes text information, then current topics generator 205 uses a Latent Dirichlet Allocation (LDA) algorithm to analyze the text information for topics. In another embodiment, if the record includes text information, then current topics generator 205 uses a probabilistic latent semantic indexing (pLSI) algorithm to analyze the text information for topics. In other embodiments, current topics generator 205 uses other algorithms to perform the analysis that are appropriate to the type of information contained in the recent information. In an embodiment, current focus manager 204 forms an artificial document with a content that reflects the current topics in the set of current topics in proportion to their strength in the user's recent information access activity.

In an embodiment, current focus vector generator 207, receives the artificial document from current focus manager 204 and the set of principal topics (that were generated from the content of the selection of information nodes) from principal topics generator 203. Current focus vector generator 207 generates one current focus vector that reflects the affinity that the artificial document (which reflects the user's current focus) has for each of the principal topics in the set of principal topics. Values in the current focus vector are in one-to-one correspondence with the principal topics in the set of principal topics.

In an embodiment, rendering manager 210 receives the current focus vector from current focus vector generator 207 and the set of node topic vectors from node topic vector generator 206 and visually renders representations of them in a way that reveals an affinity (i.e., similarity) that a node topic vector has for the user's current focus. In an embodiment, the affinity that a given information node (the content of which is measured by a node topic vector) has for the user's current focus (the content of which is measured by the current focus vector) is calculated by taking the inner product of the two vectors. The inner product (also called dot product or scalar product) of two vectors is an algebraic operation that returns a single value. The value is the magnitude of one vector in the direction of the other vector in the vector space in which the vectors are defined. A node vector and the current focus vector are in a topic vector space that has the principal topics as its basis vectors, and has a dimension equal to the number of principal topics. In the topic vector space the inner product of two vectors is a measure of the similarity of the two vectors, i.e., a measure of the similarity of a content of an information node (represented by a node topic vector) to the content of a user's current focus (represented by the current focus vector).

In some scenarios and embodiments, algorithm manager 212, a function in rendering manager 210, renders a representation of each of the information nodes (that node topic vector generator 206 receives from context manager 202) and the current focus (represented by the current focus vector) in positions based on the strength of similarities of their contents with each other and with the current focus. In an embodiment, algorithm manager generates a force directed graph of the representations of the information nodes and the current focus. In an embodiment, a representation of the current focus is centrally located in a rendering with an edge (a line) from the current focus representation to each information node representation. In an embodiment, each of the principal topics is also rendered as a special information node, a "topic" node, with one or more edges between a topic node and the information nodes. In an embodiment, an attractive force on edge between an information node and a topic node is in proportion to the affinity of the information node with a topic represented by the topic node. In an embodiment, physical forces of attraction and repulsion between rendered representations of information nodes, the current focus, and, in an embodiment, the principal topics, are used to create a resulting natural arrangement of the representations. That is, algorithm manager 211 renders the representations in the positions that are in equilibrium with the forces acting on the representations. In an embodiment, spring-like attractive forces based on Hooke's law (attractive force is proportional to distance) are used to attract pairs of representations towards each other, while simultaneously repulsive forces like those of electrically charged particles based on Coulomb's law (where the repulsive force of like charges is inversely proportional to the square of the distance, i.e., half the distance quadruples the force) are used to separate all pairs of representations. In an embodiment, the strength of the attractive force between a representation of the current focus and a representation of an information node is in direct proportion to the value of the inner product of the current focus vector and the node topic vector that is associated with the information node.

In an embodiment, a user can access an information node whose representation is displayed in a rendering by selecting the representation of the information node in the rendering. In an embodiment, when an information node (i.e., a file) is stored in storage 107, a topic vector is generated for the information node and is associated with the location of the information node in storage 107. The location is mapped to the topic vector of the information node by index manager 209 in storage manager 208 in an index. The index provides a location of an information node in storage 107 when the index is accessed by the topic vector of the information node. In effect, the index enables an information node to be accessed by its contents, which are represented by its topic vector. Such an index is often termed an inverted index.

In an embodiment, rendering manager 210 renders an information node that contains words of text as a wordle (i.e., a word cloud). The wordle is a group of commonly occurring words in the information node. In an embodiment, the size of each word in a wordle is a function of its prevalence in the information node. In an embodiment, the size a word in a wordle of an information node is in direct proportion to the prevalence of the word in the information node. In another embodiment, the size of prevalent words are exaggerated and the size of infrequent words are minimized. In an embodiment, rendering manager 210 accesses storage 107 for an information node using its associated node topic vector that rendering manager 210 receives from node topic vector generator 206. Storage manager 208 submits the node topic vector to index manager, which accesses the inverted index with the node topic vector and acquires the location of the information node in storage 107. Algorithm manager 211 coverts the contents of the information node into a wordle and renders the wordle. In an embodiment, algorithm manager 211 renders a position of the center of a wordle as an equilibrium position (for the information node from which the wordle is derived) in a force directed graph.

In an embodiment, rendering manager 210 in semantic proximity system 108 renders the similarity of the contents of the collective information nodes of a group of users relative to the current focus of each user in a rendering for each user.

Figure 3:
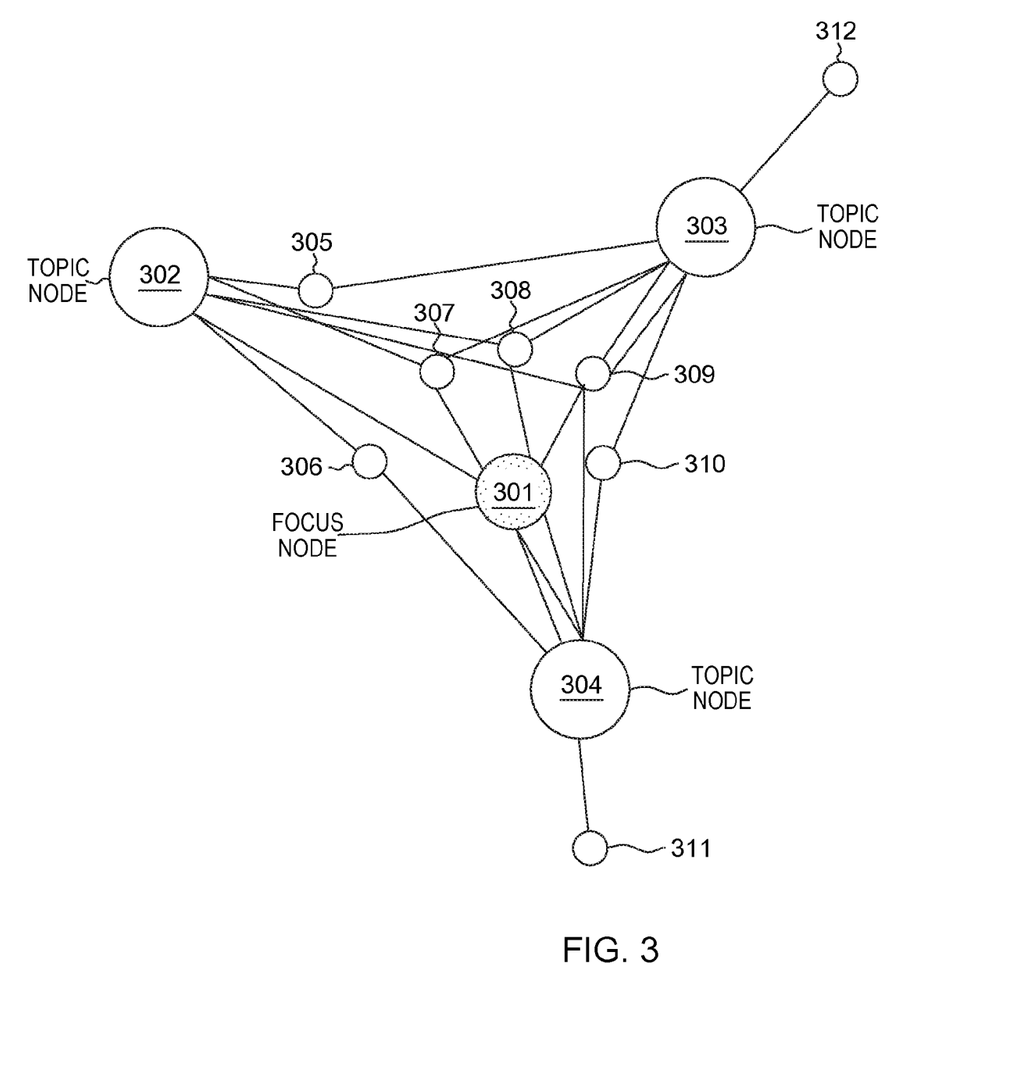
FIG. 3 depicts an example force directed graph in accordance with an embodiment of the present invention.

FIG. 3 depicts example force directed graph with representations (i.e., nodes) 301, 302, 303, 304, 305, 306, 307, 308, 309, 310, 311, and 312. In an embodiment, node 301 represents the current focus node, nodes 305, 306, 307, 308, 309, 310, and 311 represent the selected information nodes, and, in an embodiment, nodes 302, 303, and 304 represent principal topic nodes. The proximity of an information node (e.g., node 308) to the current focus node (node 301), reflects the similarity of content the nodes share, i.e., an affinity of the content of one node to the content of the other node. In an embodiment, edges are rendered between information nodes and the principal topic nodes, as well as between the focus node and the principal topic nodes. Nodes which are not connected by an edge are repelled from one another.

Force directed graphs can be generated in many ways and can use a variety of attractive and repulsive functions to arrange the nodes rendered in them. In an embodiment, the focus node can attract the information nodes and the topic nodes can attract the information nodes. In an embodiment, the focus node can attract the information nodes and there is no attraction between the topic nodes and the information nodes. In an embodiment, the edges are not rendered and are manifest only in force and rendering calculations, and not in a rendering itself.

Figure 4:
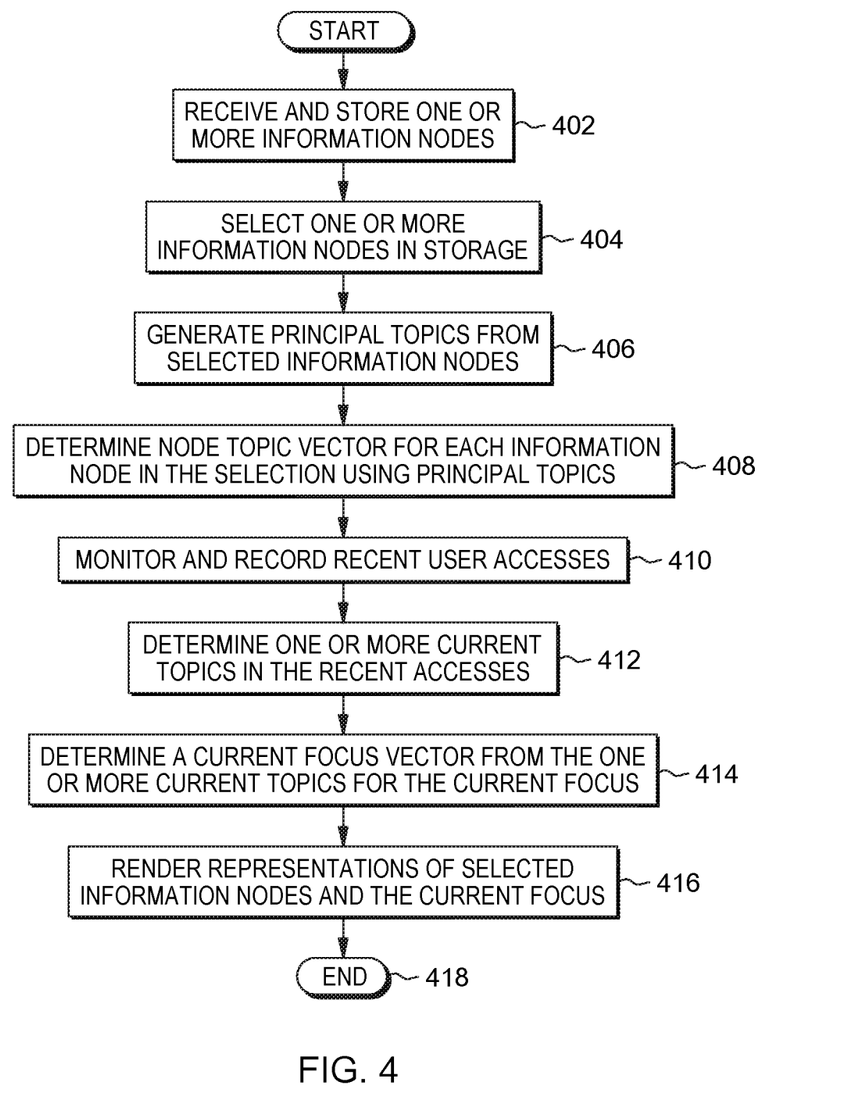
FIG. 4 depicts a flow chart for an operation of the semantic proximity system depicted in FIG. 2, in accordance with an embodiment of the present invention.

FIG. 4 depicts the operational steps performed by semantic proximity system 108, in an embodiment and scenario. Information nodes (files) are received and stored in storage 107 in step 402. One or more information nodes in storage 107 are selected for rendering by context manager 202 in step 404. A set of principal topics is generated from the selected information nodes by principal topics generator 203 in step 406. A node topic vector is generated for each of the selected information nodes by node topic vector generator 206 in step 408. A user's recent accesses are monitored and recorded by current focus manager 204 in step 410. The content of the user's recent accesses are analyzed and a set of primary topics are identified in the recent accesses by current topics generator 205 in step 412. A current focus vector is generated from the primary topics by current focus vector generator 207 in step 414. Representations of the selected information nodes and the current focus are rendered by algorithm manager 211 in step 416.

Figure 5:
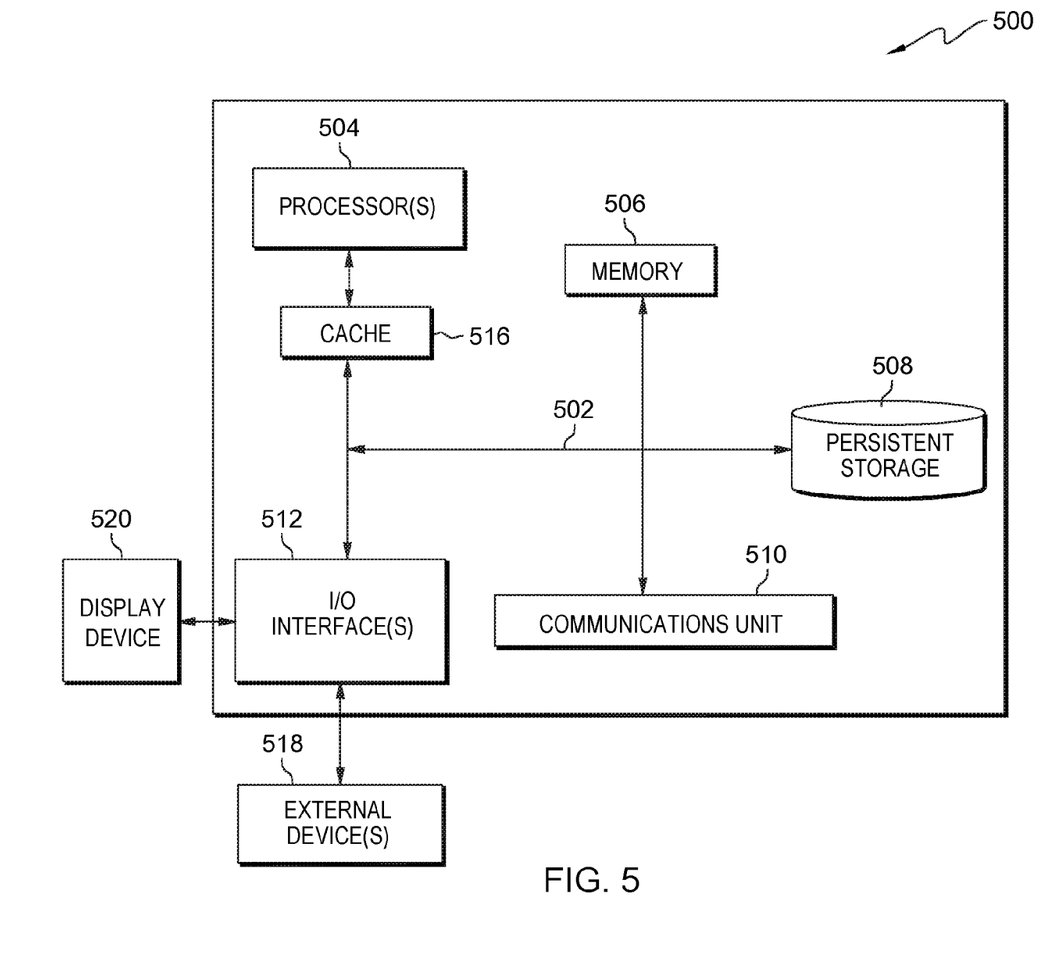
FIG. 5 depicts a block diagram of the computer system that is depicted in FIG. 1, in accordance with an embodiment of the present invention.

FIG. 5 depicts computer system 500 that is an example a computer system that hosts the functions of semantic proximity system 108 in computer system 101. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory. In an embodiment, memory 506 is an example of memory 106 and persistent storage 508 is an example of storage 107. In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective processors 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 503 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer system for managing and rendering one or more information nodes relative to a current focus on a display device of a computer, the computer system comprising:
    one or more computer processors;
    one or more non-transitory computer-readable storage media; and
    program instructions stored on at least one of the one or more non-transitory computer-readable storage media, the program instructions executed by at least one of the one or more processors comprising:
    program instructions to receive one or more principal topics from a content of one or more information nodes visited by a user, wherein the one or more information nodes includes at least one first information node;
    program instructions to determine a topic vector from a similarity of a content of the first information node to the one or more principal topics, wherein the topic vector is determined using a Latent Dirichlet Allocation algorithm;
    program instructions to create a map from the topic vector to a storage location of the first information node;
    program instructions to determine one or more current topics from a content of a second information node, wherein the second information node is an information node that has been accessed recently;
    program instructions to determine a current focus vector from a similarity of the one or more current topics to each principal topic of the one or more principal topics, wherein the current focus vector is determined using the Latent Dirichlet Allocation algorithm;
    program instructions to render a representation of the current focus vector and a representation of the first information node on the display device of the computer according to a rendering algorithm, wherein the rendering algorithm:
    determines a position and a size of the representation of the current focus vector and of the first information node;
    includes a force-directed drawing algorithm;
    includes an algorithm that renders a content of the first information node as a word cloud; and
    uses the similarity of the one or more current topics to said each principal topic of the one or more principal topics to generate a position and a size of the representation of the current focus vector and of the first information node; and
    program instructions to access the first information node in the storage location by selecting the representation of the first information node.

* * * * *